United States Patent Office 3,666,561
Patented May 30, 1972

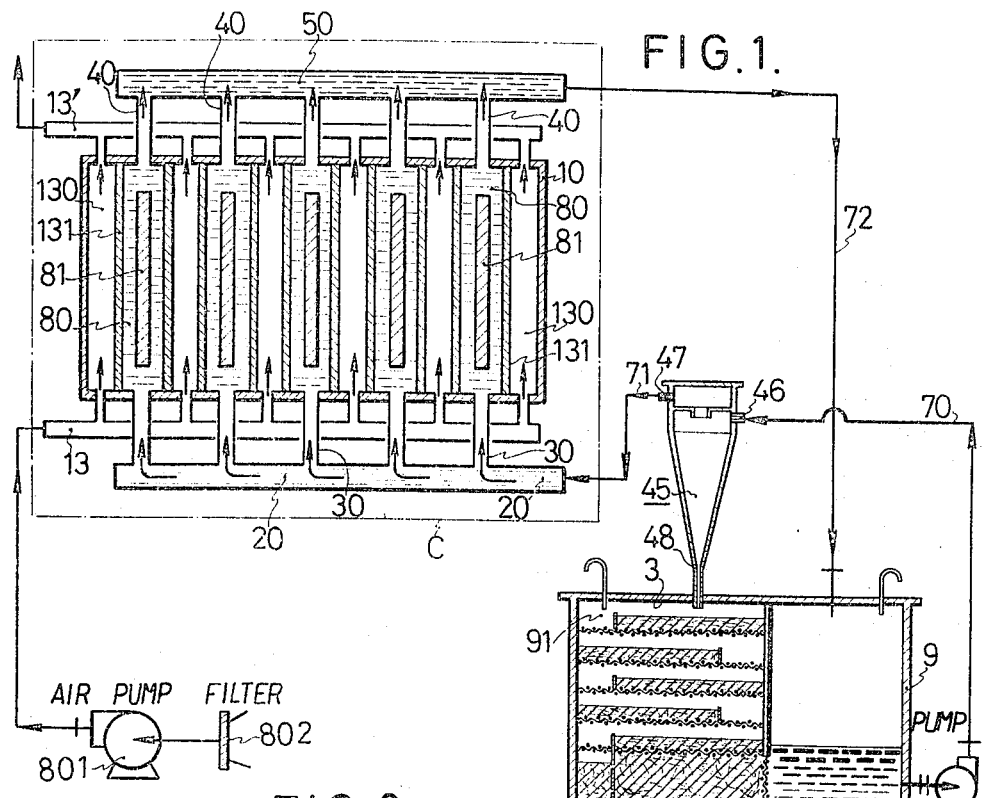
FIG.1.
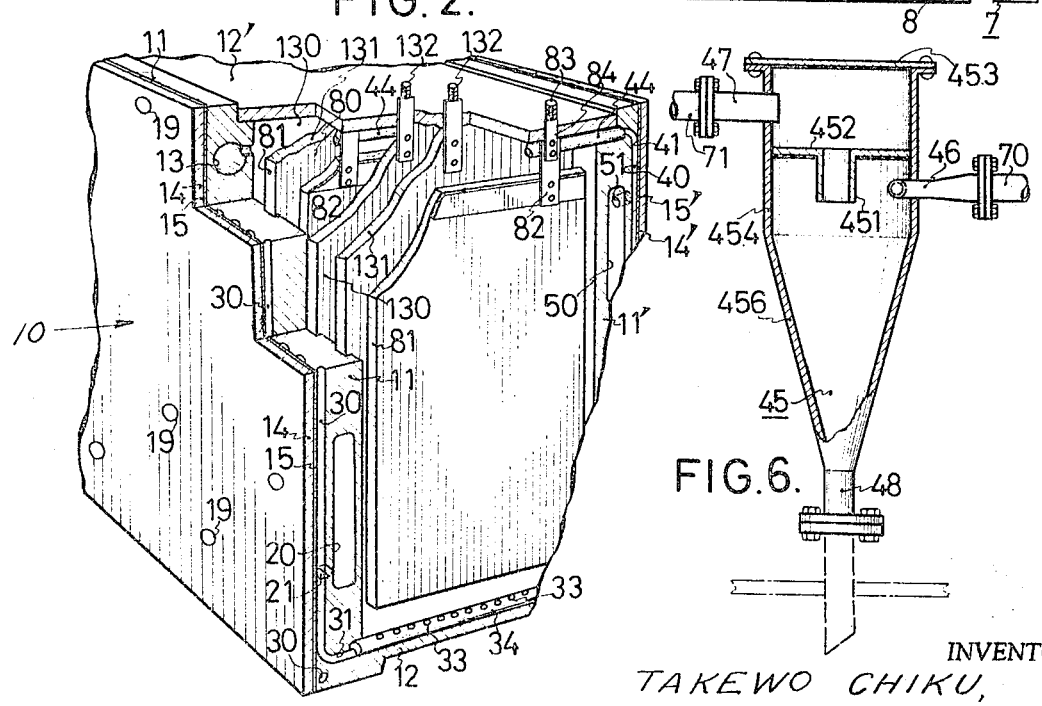
FIG.2.
FIG.6.
INVENTOR
TAKEWO CHIKU

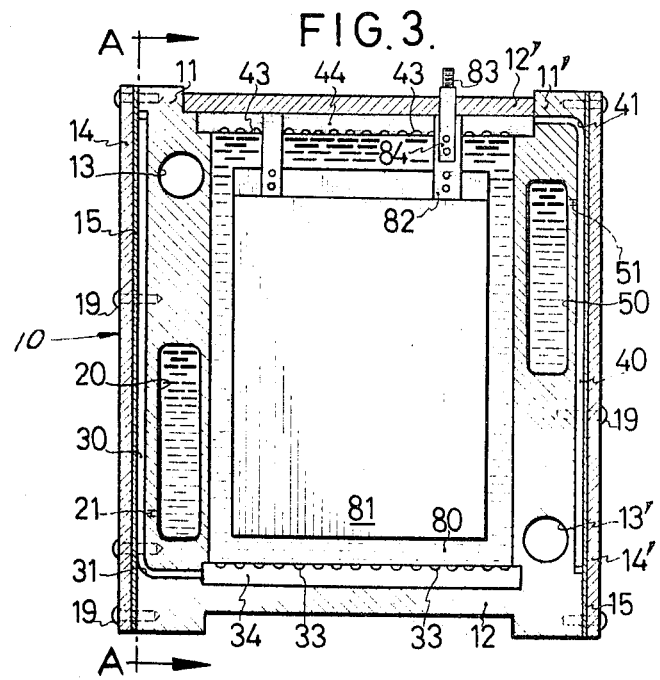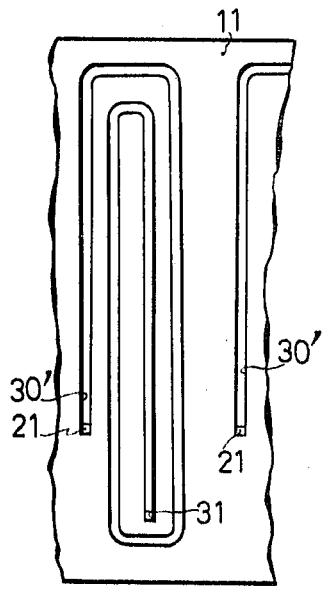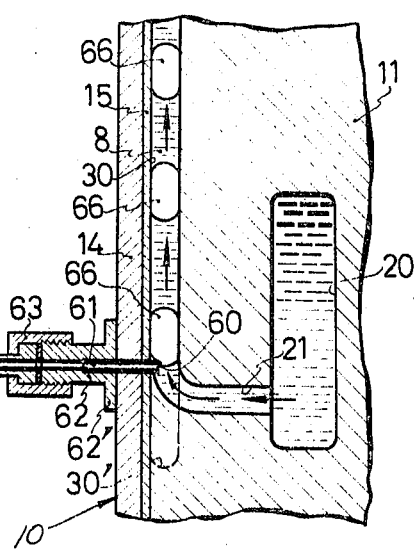

3,666,561
ELECTROLYTE CIRCULATING BATTERY
Takewo Chiku, Toyota, Japan, assignor to Kabushiki Kaisha Toyota Chuo Kenkyusho, Hisakata, Showa-ku, Nagoya-shi, Aichi-ken, Japan
Filed Feb. 26, 1970, Ser. No. 14,551
Claims priority, application Japan, Apr. 11, 1969, 44/28,545
Int. Cl. H01m 27/00
U.S. Cl 136—86 R            9 Claims

ABSTRACT OF THE DISCLOSURE

An electrolyte circulating battery having a plurality of cells electrically connected in series and supplied with circulating electrolyte, wherein there is provided a main electrolyte inlet passage and branched inlet passages leading therefrom to each cell, and branched outlet passages leading from each cell to a main electrolyte outlet passage, the branched inlet and outlet passages being made sufficiently long and of sufficiently small cross-section to prevent passage of any substantial amount of internal current between cells. Gas, such as air and oxygen, is introduced into the branched inlet end and/or outlet passages through needles to form bubbles in the electrolyte, thereby further increasing the electric resistance in said branched passages.

BACKGROUND OF THE INVENTION

This invention relates to improvements in electrolyte circulating batteries. An electrolyte circulating battery may move the electrolyte to and through a plurality of cells in series one after the other, or to all cells simultaneously by a number of parallel paths. When the electric circuit of the battery is unconnected, or open, or when the battery is connected to a load to discharge, each cell is conductive to all the other cells in the circulating system by the electrolyte on the inlet side of the cell (branched inlet passages and main inlet passage) and the electrolyte on the outlet side (branched outlet passages and main outlet passage), and the cells can be considered to be arranged in parallel by the mentioned electrolyte paths, or passages, the resistance of the electrolyte in such paths constituting part of the internal resistance of the battery.

Accordingly, current is passed between said cells and, therefore, the discharging capacity or property of the individual cells cannot be utilized independently of one another. Moreover, the discharging properties of the individual cells are each different and irregular depending on their position in the series.

During charging of a conventional battery, as above described, a part of the charging current leaks into the main electrolyte outlet passage or main inlet passage, just as during discharge, to cause loss of charging power. In addition, the amount of charging current taken by an individual cell is different from that taken by others depending on the cell position, and it is difficult to uniformly charge all the cells. This also affects the discharging properties of the battery.

SUMMARY OF THE INVENTION

The present invention seeks to overcome the defects and disadvantages of conventional electrolyte circulating batteries as briefly outlined above.

In order to avoid the short-circuiting internal currents between cells and to obtain normal battery effect, it is necessary to prevent internal currents between cells through the electrolyte passing through the inlet and outlet passages. For this purpose, it has been found necessary to greatly increase the electric resistance in these electrolyte paths, or passages.

The present invention provides an electrolyte circulating battery of improved characteristics wherein to prevent the flow of current between the cathode or the anode of any one cell, and the cathode or the anode of any other cell, the branched electrolyte inlet and outlet passages to and from the cells are greatly lengthened and considerably reduced in cross-section so that the electric resistance of the electrolyte in each branched passage is increased. Short-circuiting internal currents are further prevented by supplying a gas, such as air and oxygen, into said branched inlet and outlet passages to create bubbles in the electrolyte, thus further increasing the resistance of electrolyte in said passages.

From the above, it will appear that a primary object of the present invention is to provide an improved electrolyte circulating battery having excellent performance.

Another object of the invention is to provide an electrolyte circulating battery having excellent charging and discharging properties.

A further object of the invention is to provide an electrolyte circulating battery wherein the short-circuiting currents in the electrolyte between the cells of the battery are prevented, or at least considerably diminished.

A still further object of the present invention is to provide an electrolyte circulating battery wherein the electric resistance in the branched passages for electrolyte between the main inlet and outlet passages and the electrolyte chambers of the respective single cells is increased.

A still further object of the present invention is to provide an electrolyte circulating zinc-air battery having excellent performance.

The novel features that are considered characteristic of the invention are set forth with particularity in the appended claims. The invention, itself, however, both as to its organization and its method of operation, together with additional objects and advantages thereof, will best be understood from the following description of specific embodiments when read in connection with the accompanying drawings, wherein like reference characters indicate like parts throughout the several figures, and in which:

FIG. 1 is a flow sheet showing a zinc-air battery of electrolyte circulating type according to the present invention;

FIG. 2 is a perspective view, in section, with parts broken away, of the zinc-air battery of electrolyte circulating type constructed according to the present invention;

FIG. 3 is a transverse vertical cross-sectional view taken through a typical electrolyte chamber of the battery in FIG. 2;

FIG. 4 is a cross-sectional view taken along line A—A of FIG. 3, with parts broken away;

FIG. 5 is an enlarged cross-sectional view showing the main portion of another embodiment of the present invention; and FIG. 6 is an elevational view, partially in cross-section, of a conventional cyclone separator.

DESCRIPTION OF A PREFERRED EMBODIMENT

The present invention relates to an electrolyte circulating battery, such as a hydro-oxygen (air) fuel cell, a zinc-air battery, or a hydrazine-air fuel cell, wherein a plural number of single cells are electrically serially connected, and are operated while circulating electrolyte parallelly, or serially. As stated supra, the object of the present invention is to greatly increase the efficiency of such a battery by preventing the flow of current between the cathode or the anode of one cell, and the anode or cathode of another cell, by virtue of increasing electric resistance in the inlet or outlet passage for the electrolyte.

One type of electrolyte circulating battery, namely, zinc-air battery, is taken as an example. The rectangular box-like ABS resin casing thereof, encircled by a dash-and-dot line in FIG. 1, is divided into a series of compartments by air electrode plates 131, made mainly of carbonyl nickel, to form alternating air chambers 130 and electrolyte chambers 80. Each electrolyte chamber 80 has a zinc plate 81. Thus, it will be seen that the battery consists of five single cells wherein each pair of air electrodes 131 facing each other across an electrolyte chamber 80 forms the cathode of a cell and the zinc plate 81 forms the anode of such cell.

The electrolyte circulation system is shown in FIG. 1. Electrolyte 8 in tank 9 is pumped through inlet pipe 70 to a conventional cyclone separator 45 by action of pump 7, and leaves through inlet pipe 71 which connects to the main inlet passage or manifold 20, and then flows to the bottom of each electrolyte chamber 80 hrough the branched inlet passages 30. The electrolyte leaves each chamber 80 through the branched outlet passages 40 and outlet manifold 50, from which it flows back to the tank 9 through the outlet pipe 72.

The air circulation system is also shown in FIG. 1. Air is pumped into air chambers 130 by pump 801 through the air inlet passage or manifold 13 and a part of the excessive amount of air is removed through the outlet passage or manifold 13'. Pump 801 is provided with filter 802.

The casing is formed essentially by a pair of end wall members (shown diagrammatically in FIG. 1), a pair of sidewall members, a bottom 12, and a lid 12'. The sidewall members include sidewalls 11, 11' which are about 25 mm. thick.

As seen in FIGS. 2 and 3, the main electrolyte inlet passage or manifold 20, of substantially rectangular cross-section (approximately 13 x 60 mm.) is provided within the sidewall 11 and extends longitudinally therein. On the outer surface of the sidewall 11 are channels 30' which have a width of about 2 mm., a depth of about 2 mm. in cross-section, and a length of about 430 mm. The channels 30' are spiral-like in configuration, as shown in FIG. 4. Extending longitudinally within the other sidewall 11' is the main outlet passage 50 for electrolyte, and on the outer surface of the sidewall 11' are channels having a width of about 3 mm. and a depth of about 3 mm. in cross-section. Sidewall plates 14, 14' and flat rubber gaskets 15, 15' are mounted on the outer surfaces of the sidewalls 11, 11' by screws 19. Thus, the gasket 15, together with the channels 30', form the branched inlet passages 30 for electrolyte. Similarly, the gasket 15', together with the channels formed on the outer surface of sidewall 11', form branched outlet passages 40. Each of the branched passages 30 and 40 are spiral-like in configuration, as shown in FIG. 4. One end of each branched passage 30 is connected to the main electrolyte inlet passage 20 by a small passage 21, and the other end is connected to an inlet pipe 34 through a small passage 31. Similarly, one end of each branched passage 40 is connected to the main electrolyte outlet passage 50 by a small passage 51, and the other end is connected to an outlet pipe 44 through a small passage 41.

As seen in the typical electrolyte chamber 80 shown in FIG. 3, the electrolyte inlet pipe 34, mounted on the bottom 12 and extending transversely thereof, has a plurality of holes 33 permitting the electrolyte to flow into the chamber 80 at the bottom thereof. Extending between sidewalls 11, 11' in the upper portion of the chamber 80 is the electrolyte outlet pipe 44 which is also provided with a plurality of holes 43 for permitting the egress of the electrolyte into the branched outlet passages 40.

As shown in FIGS. 2 and 3, the zinc electrode 81 (as the anode) is secured to the outlet pipe 44 by the iron strip 82. The lower end of the anode terminal 83 is fixed to the iron strip 82 by bolt-nut 84, and the upper end thereof extends through the lid 12'.

As shown in FIG. 3, sidewall 11' is provided with a longitudinally extending air inlet passage 13', circular in cross-section and having a diameter of about 15 mm. The other sidewall 11 is provided with an air outlet passage 13, circular in cross-section and having a diameter of about 15 mm. The passages 13, 13' are connected to air chambers 130 by branched air passages, as shown in FIG. 1.

FIG. 6 shows a conventional cyclone separator 45 for separating the particles of zinc oxide from the electrolyte by the action of centrifugal and centripetal forces. A conical section 456 is provided on the lower end of the cylindrical portion 454, and an outlet 48 is integrally formed at the bottom of the conical section 456. The separator is closed at the top by a fixed plate 453.

Mounted within the cylindrical portion 454 is an apertured plate member 452 which has a sleeve or vortex finder 451 depending therefrom coaxially with the axis of the portion 454. A nozzle 46, connected to the inlet pipe 70, extends through the sidewall of the separator 45 below the member 452 and is positioned to direct the flow of electrolyte tangentially within the cylindrical portion 454. An outlet conduit 47 extends through the sidewall of the separator and is connected to the electrolyte inlet pipe 71.

The separator 45 is fixed to the tank 9 by connecting the outlet 48 to the inlet conduit 5 which extends through the lid 3 of the electrolyte tank 9 above the filter layers 91 carried therein.

The purpose of the cyclone separator will be explained below. Electrolyte 8, accompanied by the particles of zinc oxide generated during discharging from the chamber 80, flows to the tank 9 through outlet pipe 72, and then is pumped through inlet pipe 70 into the separator 45. Through centrifugal force within the separator 45, the particles of zinc oxide are collected on the inner wall of the separator and flow downwardly, in the form of a slurry, through the outlet 48 onto the filter layers 91 and are collected thereon.

The electrolyte, with the particles of the zinc oxide removed, flows out of the separator 45 through outlet 47 and into the electrolyte chambers 80 through the inlet pipe 71. Thus, the concentration of zinc oxide particles in the electrolyte chambers is kept low.

When the charging operation is carried out, particles of zinc oxide in the electrolyte are deposited in the form of zinc on the surface of the zinc plates 81 and the concentration of particles of zinc oxide in the electrolyte is reduced in chambers 80. However, some of the electrolyte which had dropped from the outlet 48 of the cyclone separator 45, gradually dissolves the particles of zinc oxide previously collected on the filter layers during discharging, and such electrolyte flows from the portion of the tank 9 containing the filter layers 91 into the portion of the tank 9 containing the main body of the electrolyte 8 to be circulated to the electrolyte chambers 80 through pipe 70, outlet 47 of the separator 45, and pipe 71, to restore the concentration of zinc oxide in chambers 80, thereby effectuating the smooth deposition of zinc onto the zinc electrodes.

As the electrolyte of the zinc-air battery, a 30% potassium hydroxide aqueous solution was used. The electric resistance across both ends of each branched inlet passage 30 was 2500Ω at 25° C. In each branched outlet passage 40, air which had diffused through the air electrode plates 131 is mixed with and flows along with the electrolyte 8. Therefore, the electric resistance in each outlet passage 40 is high and is about 8000Ω at 25° C. As a result, the internal battery current between the respective single cells is reduced, and the object of the present invention is attained.

Another embodiment of the present invention is shown in FIG. 5, wherein air is supplied to each branched inlet passage 30 in the preceding embodiment of the present invention. A fitting 62, having a flange 62', is secured to the outside of the wall plate 14 of the casing 10, and is longitudinally bored to have an internal diameter of about 0.3 mm. and to receive one end of a small injection needle 61 having an internal diameter of about 0.3 mm. and an outer diameter of about 0.6 mm. The other end of the needle 61 extends through the sidewall plate 14 and gasket 15 so that the nozzle 60 is inserted about 1 mm. into the branched inlet passage 30 close to the small passage 21 which connects the main inlet passage 20 and the branched inlet passage 30. An air inlet pipe 64, connected to a soursce of air not shown, has one end connected to the fitting 62 by a bag nut 63 and is aligned with the fitting's bore to permit the flow of air from the pipe 64 into the air inlet passage formed by the bore of the fitting 62 and the needle 61, and then into the passage 30.

When air under pressure of about 0.1 kg./cm.² higher than the liquid pressure of the electrolyte 8 is intermittently introduced into the passage 30 through the needle 61, bubbles 66 are formed in the electrolyte 8 in passage 30, thereby increasing the electric resistance in the passage 30. The bubbles 66 move into the electrolyte chambers 80 along with the electrolyte 8, and exit through the branched outlet passages 40.

When the same amount of air as the amount of the circulated electrolyte was sent in the above case, the electrical resistance across the ends of each of the branched inlet passages 30 at 25° C. was 14,000Ω, about 6 times the electric resistance where the electrolyte alone is used, and the electric resistance in the branched outlet passage was increased to 20,000Ω. This confirmed that the short-circuiting battery current between the respective single cells is very, very small, or negligible.

Since air is introduced into the branched inlet passage 30 as mentioned above, and air is introduced into the chambers 80 through the air electrode plates 131, the electric resistance in the branched outlet passages 40 will be increased without further supply of air therein. However, if desired, each outlet passage 40 may be provided with an air inlet passage of construction similar to that provided by fitting 62 and needle 61.

The supply of gas into the branched passages may be carried out intermittently or continuously, and it is only necessary to supply gas in an amount sufficient to obtain the desired electrical resistance. Further, when gas is supplied, it is not always necessary to make the branched passages long and small in cross-section.

In the embodiment shown in FIG. 5, a separator is also preferably employed and operates in the same manner as described above with respect to the battery of FIGS. 1–4.

In view of the foregoing paragraphs, in the electrolyte circulating battery of the present invention wherein a plural number of single cells are serially connected and electrolyte is serially or parallelly circulated, the branched electrolyte inlet passages for each single cell are made sufficiently long and small in cross-section to increase the electric resistance and to prevent the battery current between the respective single cells on the electrolyte inlet side. Also, the branched electrolyte outlet passages for connecting each cell to the electrolyte tank are made sufficiently long and small in cross-section to increase the electric resistance and to prevent the battery current between the respective single cells on the electrolyte outlet side. In this manner, the deterioration of the discharge capacity and discharging property of the single cell during discharging and the loss of the charging power during charging can be prevented, and the characteristics of the battery can be effectively utilized.

Further, in accordance with the present invention, air, oxygen, or a similar gas, is introduced into the branched electrolyte passages, of both branched inlet and outlet passages for electrolyte, to place bubbles in the electrolyte, thereby increasing the electric resistance in the branched passages, and the battery current between single cells can be almost eliminated.

In the above given embodiments, the main inlet and outlet passages for electrolyte and the branched inlet and outlet passages for electrolyte are provided within the sidewall of the casing in order to make the battery compact. However, it is also possible to attain the object of the present invention by providing separate conduits for such passages outside of the sidewall and connecting such conduits to the electrolyte chambers.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

I claim:

1. An electrolyte circulating battery comprising a battery case having side walls, a plurality of cells within said case, an electrolyte reservoir tank spaced from said cells, a main electrolyte inlet passage connected to said electrolyte tank by an inlet pipe, means defining branched electrolyte inlet passages leading from said main inlet passage to each of said cells, a main electrolyte outlet passage connected to said electrolyte tank by an outlet pipe, means defining branched electrolyte outlet passages leading from each of said cells to said main outlet passage, said branched inlet and outlet passages being provided in the side walls of the battery case, injection needles, one end of each injection needle being projected into each branched inlet passage and the other end thereof being connected to a source of gas through gas inlet pipes, and means for circulating the electrolyte from said reservoir tank to said cells and back to the tank, whereby gas is introduced into said branched inlet passages through said needles to form bubbles of gas therein, thereby reducing internal battery current between the cathode or the anode of any one cell and the anode or the cathode of any other cell.

2. An electrolyte circulating battery according to claim 1, further comprising injection needles one end of each thereof being projected into said branched outlet passages and the other end thereof being connected to a source of gas through gas inlet pipes.

3. An electrolyte circulating battery according to claim 1, wherein said needles are projected into said branched inlet passages near the main inlet passages.

4. An electrolyte circulating battery according to claim 1, wherein each sidewall has an outer wall plate and each sidewall has channels on its outer surface cooperating with its outer wall plate to define said branched inlet and outlet passages and said needles are projected into said branched inlet passages through said wall plates.

5. An electrolyte circulating battery according to claim 2, wherein each sidewall has an outer wall plate and each sidewall has channels on its outer surface cooperating with its outer wall plate to define said branched inlet and outlet passages and said needles are projected into said branched inlet and outlet passages through said wall plates.

6. An electrolyte circulating battery according to claim 1, wherein said needles are secured to said sidewalls.

7. An electrolyte circulating battery according to claim 1, wherein said battery is of the zinc-air type.

8. An electrolyte circulating battery according to claim 7, further comprising a cyclone separator for separating zinc oxide particles from the electrolyte, said separator being positioned between said cells and said means for circulating the electrolyte and in communication with said tank to discharge said zinc oxide particles therein.

9. An electrolyte circulating battery according to claim 1, wherein said branched passages have a non-linear portion between the ends thereof.

References Cited
UNITED STATES PATENTS 3,537,904  11/1970  Matsuda et al. ----- 136—86 R
3,522,098   7/1970  Sturm ------------- 136—86 R WINSTON A. DOUGLAS, Primary Examiner H. A. FEELEY, Assistant Examiner